Nov. 14, 1967        G. E. THOMPSON         3,352,383
                VEHICLE DRUM BRAKE ADJUSTER
Filed March 4, 1966                        3 Sheets-Sheet 1

United States Patent Office 3,352,383
Patented Nov. 14, 1967

3,352,383
VEHICLE DRUM BRAKE ADJUSTER
George Eric Thompson, Birmingham, England, assignor to Girling Limited, Birmingham, England, a British company
Filed Mar. 4, 1966, Ser. No. 531,855
Claims priority, application Great Britain, Mar. 5, 1965, Ser. No. 9,376/65
7 Claims. (Cl. 188—79.5)

ABSTRACT OF THE DISCLOSURE

Automatic adjuster for shoe drum brakes having an adjustable abutment for one end of the shoes remote from an actuator at the other, a lever pivotally mounted intermediate its ends to one of said shoes and having means at one end cooperating with the adjustable abutment to increase the length thereof in response to brake shoe wear, an abutment engaged by the opposite end of the lever adjacent the actuator with the lever end being normally held in engagement with the abutment by the brake shoe retracting spring, the lever end fulcruming against the abutment during normal operation but the end being capable of being moved clear of the abutment against the force of the retracting spring when the adjustable abutment is incapable of adjustment, thus preventing over-adjustment or overloading of the adjusting mechanism when adjustment is for one reason or another not possible.

Detailed description

This invention concerns drum brakes for vehicles and relates more particularly to an automatic adjuster for an internal shoe drum brake.

Automatic adjusters are frequently provided in internal shoe drum brakes to provide for the maintenance of a predetermined clearance between the brake drum and the brake shoes as the latter suffer wear in use. In general, however, conventional adjusters are relatively complicated and expensive in manufacture and are often liable to malfunction if they are subjected to overloads which may occur under certain operational conditions.

According to the present invention, in an internal shoe drum brake assembly including an adjustable abutment for the end of the brake shoe remote from that which co-operates with a shoe actuator member, the abutment is engageable for adjustment purposes by one end of a unitary pivotal lever whose opposite end is normally held against a second abutment by the shoe return spring.

Preferably the adjustable abutment comprises an internally threaded cylinder having a correspondingly externally threaded strut engaged therein and extensible therefrom, either the cylinder or the strut carrying a ratchet wheel which is engageable by the end of the pivotal lever, acting as a pawl, the lever itself conveniently being pivoted about the usual shoe hold-down assembly, and the second abutment is preferably a fixed stop, for example in the form of an elongate strut which may extend either from a fixed part of the brake or from the shoe actuator member towards and for engagement by the opposite end of the lever, a common adjuster spring and shoe return spring having its ends secured on lugs presented by said strut and said opposite lever end.

The invention will be described further, by way of example, with reference to the accompanying drawings, in which.

Figures 1, 4:
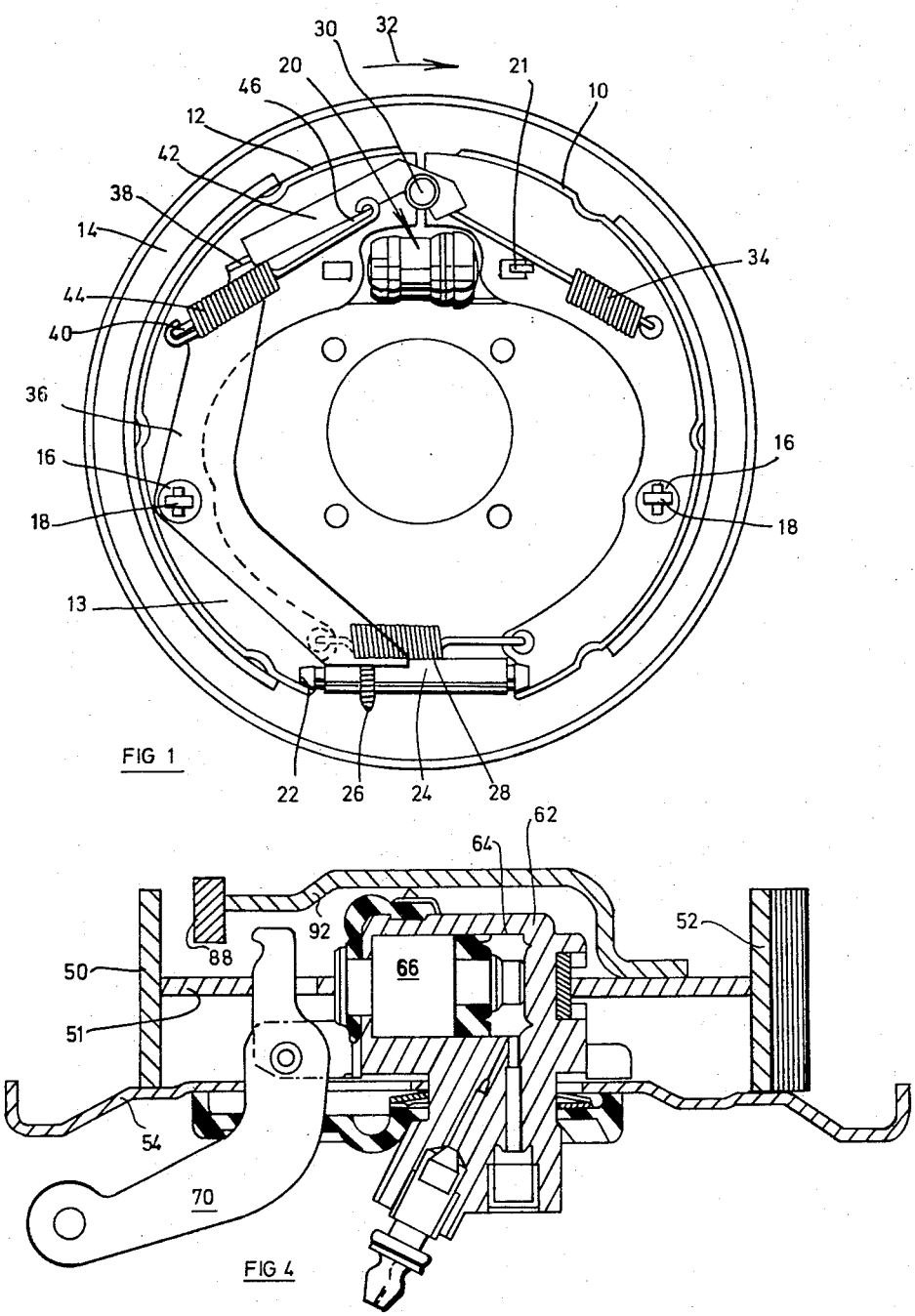
FIG. 1 is a front elevation of a duo-servo shoe drum brake assembly embodying the invention.
FIG. 4 is a section taken on the line IV—IV of FIG. 2.

In the duo-servo brake assembly shown in FIG. 1, a pair of opposed arcuate brake shoes 10 and 12 are retained in conventional manner on a back plate 14 by hold down springs 16 embracing upstanding pins 18 secured to the back plate. A hydraulically expandible piston and cylinder actuator member generally designated 20 is arranged between one pair of opposed ends of the brake shoes 10 and 12, while between the other pair of opposed ends is engaged an adjustable abutment comprising a threaded strut 22 received in a correspondingly threaded cylinder 24 having fixed to it, a so-called star wheel 26 which is a wheel peripherally formed with ratchet teeth. Between this latter pair of brake shoe ends there is also provided a tension spring 28 to urge said ends towards one another and maintain them properly engaged with the adjustable abutment 22, 24.

Symmetrically between the ends of the brake shoes which co-operate with the hydraulic actuator 20 there is provided an anchor pin 30 upstanding from the back plate 14, and between the anchor pin 30 and the shoe 10 which functions as the primary brake shoe, having regard to the normal forward direction (indicated by the arrow 32) of the usual brake drum, there is secured a shoe return spring 34. On the pin 18 of the hold down springs assembly of the secondary shoe 12, there is pivoted intermediate its ends, a generally C-shaped lever 36 having one end terminating adjacent the star wheel 26 and constituting a pawl for operative engagement with the ratchet teeth of that wheel, while the other end of the pivotal lever 36 extends towards but terminates short of the anchor pin 30. The said other end of the pivotal lever 36 is formed with a pair of spaced, upstanding lugs 38 and 40, of which one lug 38 bears against an elongate stop member 42 secured to the anchor pin 30 while the other lug 40 receives one end of a tension spring 44 having its other end slipped over a further lug 46 upstanding from the stop member 42. This latter tension spring 44 thus serves to maintain the pivotal lever 36 and stop member 42 in butting relation, and also acts as a shoe return spring for the secondary brake shoe 12.

In operation, the brake assembly shown in FIG. 1 is arranged to adjust only when the brake drum is rotating in the reverse direction. Thus, if the brake assembly is actuated during reverse rotation of the brake drum, the secondary brake shoe 12 experiences the servo-effect usually associated with the primary shoe in a drum brake, and moves away from the anchor pin 30. Since the common shoe return and adjuster spring 44 of the secondary shoe 12 retains the adjoining ends of the stop member 42 and the pivotal lever 36 in butting relation, the lever 36 rotates about its pivot 18 to carry its pawl end towards and into engagement with the teeth of the star wheel 26, thereby being operable to rotate the latter to extend the adjustable strut 22, 24 and effect a wear-compensating displacement of the two brake shoes. Should there be no wear to take up, however, or if for any other reason the load on the threads of the adjustable strut 22, 24 should become excessive to the extent that the star wheel 26 cannot be rotated by the pawl end of the pivotal lever 36, then the spring 44 will yield to allow the opposite end of the lever to move off the stop member 42.

Since the adjuster provided in the brake assembly of the invention utilizes only the simple pivotal lever 36 and fixed stop member 42 with a spring 44 to normally retain the two bearings against one another, it represents a substantial simplification relative to conventional adjusters, and is both more economical in manufacture and more reliable in operation.

It will be appreciated that a number of modifications may be made within the scope of the invention. For example, although the C-shaped lever has been described herein as being mounted on the shoe hold down assembly 16, 18, it may, of course, alternatively be independently pivoted to any other convenient part of the web 13 of the shoe 12. Again, while the adjustment in the particular embodiment described above is accomplished through a C-shaped lever 36 pivoted on the secondary shoe 12 and thus occurs when the brake drum is rotated in the reverse direction, it will be appreciated that by mounting a similar lever on the primary shoe, it is possible to arrange for adjustment to take place when the drum is rotating forwardly.

Figure 2:
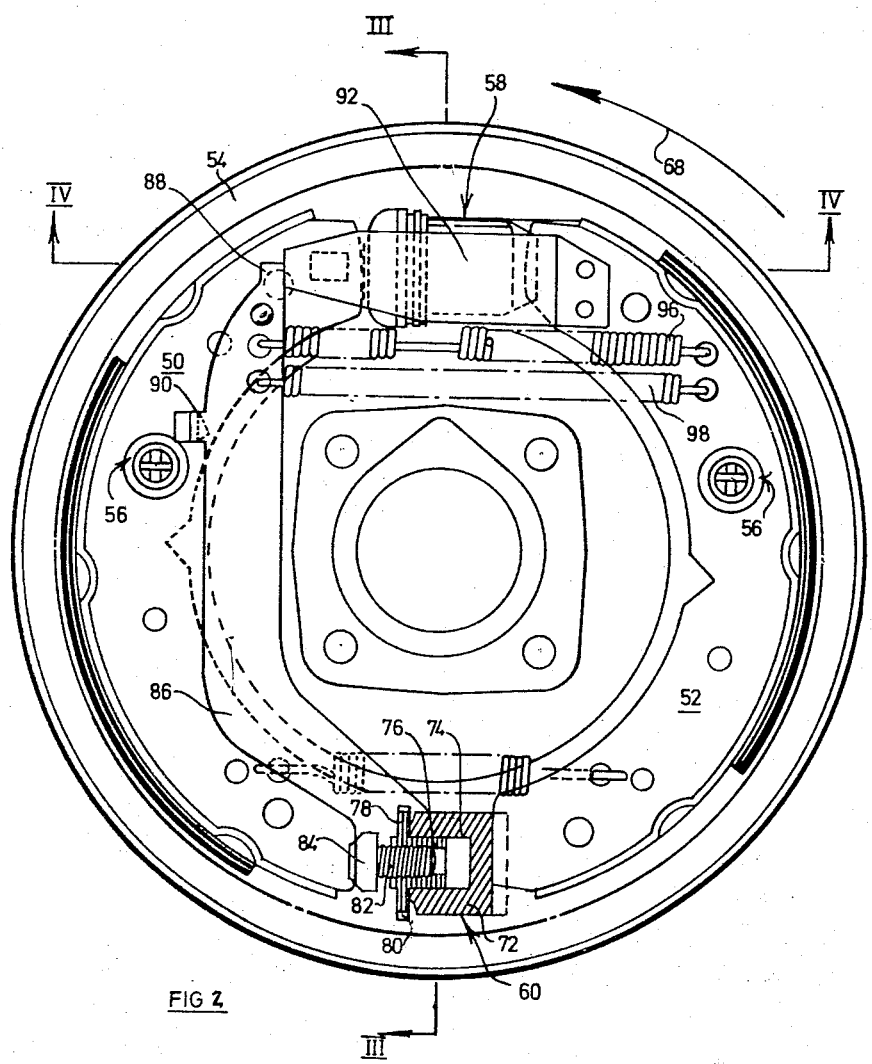
FIG. 2 is a similar elevation of a leading/trailing shoe drub brake assembly also incorporating the invention.
Figure 3:
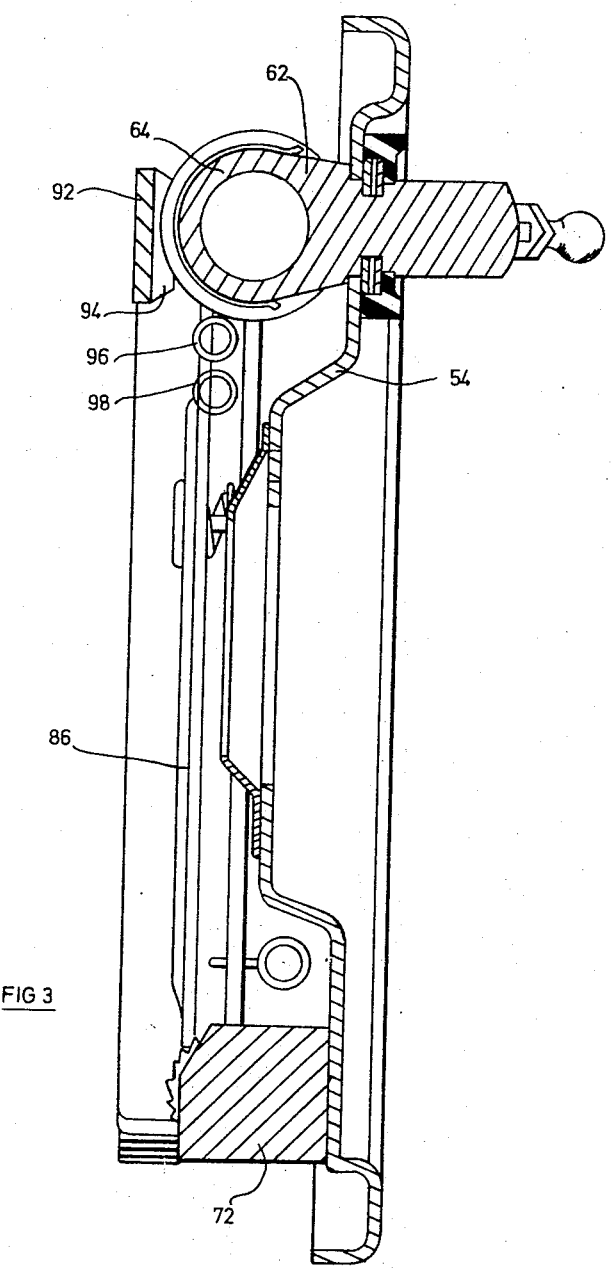
FIG. 3 is a section taken on the line III—III of FIG. 2.

FIGS. 2 to 4 inclusive of the drawings show the invention applied to an otherwise conventional leading/trailing shoe drum brake construction. As shown, a pair of arcuate brake shoes 50 and 52 are retained on a backplate 54 by the usual hold-down assemblies 56, with a conventional hydraulic piston and cylinder actuator 58 arranged between one pair of adjacent shoe ends and an adjustable fixed abutment 60 arranged between the other pair of adjacent shoe ends.

As more readily seen in FIGS. 3 and 4, the hydraulic actuator 58 comprises a cylinder body 62 which is floatingly mounted on the backplate 54. The cylinder body 62 is formed with a blind bore 64 in which is located a hydraulic piston 66, and the outer end of the piston 66 abuts the adjacent end of the brake shoe 50 while the cylinder abuts the corresponding end of the shoe 52. As will be observed, the brake shoe 50 constitutes the leading shoe for drum rotation in the normal forward direction, indicated by the arrow 68 in FIG. 2, the shoe 52 then constituting the trailing shoe.

A lever 70 for enabling the brake to be actuated mechanically is pivotally mounted on the cylinder body 62 with one of its ends adapted to act on the web 51 of the shoe 50, its other end being connectable to a conventional brake applying mechanical linkage. When the brake is operated, either hydraulically or mechanically, the leading shoe 50 is moved into braking engagement with the brake drum and thereafter the cylinder body 62 slides on the backplate 54 to apply the trailing shoe 52.

The fixed abutment 60 comprises a block 72 which is rigidly secured to the balckplate 54 and slotted at its rear end to receive the adjacent, non-actuated end of the trailing shoe 52. The block 72 is formed with a blind bore 74 at its forward end, and within the bore 74 is rotatably received a sleeve nut 76 having a radial flange 78 which bears permanently against the front face of the block 72 and which has its outer periphery provided with ratchet teeth 80 to constitute a star wheel. The nut 76 is internally threaded to receive a correspondingly externally threaded spindle 82 provided at its free end with a head 84 which is notched to receive the non-actuated end of the leading shoe 50. Drag from the leading shoe is transmitted to the block 72 through the combination of the spindle 84 and the nut 76, and it will be clear that the effective length of that combination can be increased by rotation of the nut.

For this purpose, a pivotal lever 86 somewhat in the form of a bell crank or of modified C-shape has one end terminating adjacent and serving as a pawl for cooperating with the star wheel 78, 80, while its other end is provided with an upstanding lug 88 in axial alignment with the cylinder bdoy 62 of the hydraulic actuator. Intermediate its ends, the lever 86 is provided with an upstanding knife edge 90 which bears against a cooperating reaction surface of the web 51 of the brake shoe 50, the pivotal action of the lever 86 taking place about the knife edge 90.

Secured to the actuated end of the trailing brake shoe 52 is an elongate arm or strut 92 which extends axially parallel with and over the cylinder body 62 to project beyond the opposite end thereof and towards the lug 88 of the lever 86. The projecting end of the strut 92 is turned down to provide a flange 94 and a common shoe return and adjuster spring 96, which if desired may be assisted by an auxiliary spring 98, extends between the trailing shoe 52 and that end region of the lever 86 which adjoins the actuator 58 to bias the lug 88 against the flange 94.

In operation of this embodiment of the invention, whenever the brake is actuated, whether hydraulically or mechanically, and whether in the forward or the reverse direction of motion of the drum, relative separating movement of the piston and cylinder components of the actuator 58 takes place to urge the actuated ends of the shoes 50 and 52 towards the drum. In consequence of the spring 96 (and, where it is fitted, the spring 98), the lever 86 pivots about the knife edge 90 to maintain the lug 88 bearing against the flange 94, with the result that the opposite end of the lever 86 engages the teeth 80 of the flange 78 to effect a wear-compensating extension of the adjuster 60.

Although in the embodiment of the invention shown in FIGS. 2 to 4, the strut 92 has been illustrated as being attached to the actuated end of the trailing shoe 52, it will be appreciated that it may alternatively be attached to the cylinder body 62 of the hydraulic actuator 58 or that, yet again, the cylinder body 62 may be integrally formed with a projecting end serving as an abutment for the lug 88 of the lever 86.

It will also be appreciated that the hydraulic actuator 20 of the embodiment shown in FIG. 1 may be constructed and may operate in a manner entirely analogous to the actuator 58 of the embodiment of FIGS. 2 to 4, and similarly that a mechanical actuator 21 may be provided in the former identical to the mechanical actuator 70 in the latter.

I claim:
1. In an internal shoe drum brake assembly of the type comprising a pair of arcuate brake shoes maintained by shoe hold-down means on a backplate with each end of each shoe in facing relation with a cooperating end of the other said shoe, shoe actuator means between one pair of facing ends for moving said shoes towards a braking position, spring means including a shoe return spring coupled to each shoe for normally maintaining said shoe in a retracted position and an adjustable abutment between the other pair of facing ends of said shoes, the improvement comprising a second abutment secured to the actuated end of the secondary brake, shoe of said assembly and extending across the shoe actuator means to overhang the facing end of the primary shoe, a unitary pivotal lever formed with a knife edge portion, said primary shoe having a reaction surface against which said knife edge bears, whereby said lever is pivotal relative to said primary shoe, one end of said lever constituting a pawl for engagement with said adjustable abutment and the other end of said lever being normally urged against the overhanging region of said second abutment by the primary shoe return spring.

2. An internal shoe drum brake assembly as set forth in claim 1, the adjustable abutment comprising an internally threaded cylinder member, an externally threaded strut member engaged and rotatable in said cylinder member and ratchet means on one of said members engageable by the pawl end of the pivotal lever, and wherein one of said cylinder and strut members is fixed relative to said backplate.

3. An internal shoe drum brake assembly comprising a backplate, a pair of arcuate, webbed brake shoes arranged on said backplate with each end of each shoe in facing relationship with a co-operating end of the other said shoe, shoe actuator means between one pair of facing ends of said shoes for moving said shoes towards a braking position, an adjustable abutment between the other pair of facing ends of said shoes and including a rotatable member and a non rotatable member, the non-rotatable member being fixed with respect to the backplate and said members having screw threaded connection one with the other, a unitary lever extending substantially alongside the web of one shoe which acts as a leading shoe for forward drum rotation said lever being pivotally connected to said one shoe at a position intermediate of the lever ends, a pawl at one end of said lever, a ratchet wheel on the rotatable member of said adjustable abutment, said pawl co-operating with said ratchet, an elongated strut attached at one end to the actuated end of the other shoe which acts as a trailing shoe for forward drum rotation, said strut having its other end free and overlying said actuator means and a portion of said leading shoe, an engagement between said free end of the strut and the other end of said lever, spring means coupled to each shoe for normally maintaining said shoes in a retracted position, said spring means including a shoe return spring for effecting and maintaining said engagement between said strut and said lever at least during the initial stage of brake actuation when relative movement occurs between the free end of the elongated strut and said one shoe end adjacent the actuator means and adjustment takes place in the length of said adjustable abutment responsive to excessive angular movement of said lever about said pivotal connection, whereby upon overloading of said screwthread connection said shoe spring yields to break off said engagement and interrupt adjustment.

4. An internal shoe drum brake assembly comprising a backplate, a pair of arcuate, webbed brake shoes arranged on said backplate with each end of each shoe in facing relationship with a co-operating end of the other said shoe, shoe actuator means between one pair of facing ends of said shoes for moving said shoes towards a braking position, an adjustable abutment between the other pair of facing ends of said shoes and including a rotatable member and a non-rotatable member, said members having screw threaded connection one with the other, a unitary lever extending substantially alongside the web of one shoe and pivotally connected thereto intermediate the lever ends, a pawl at one end of said lever, a ratchet wheel in the rotatable member of said adjustable abutment, said pawl co-operating with said ratchet wheel, an elongated strut attached at one end to part of the brake assembly independently of said one shoe and adjacent said actuator means, said strut having its other end free and overlying a portion of said one shoe, an engagement between said free end of the strut and the other end of said lever, spring means coupled to each shoe for normally maintaining said shoes in a retracted position and including a shoe return spring for effecting and maintaining said engagement between said strut and said lever at least during the initial stage of brake actuation when relative movement occurs between the free end of the elongated strut and said one shoe end adjacent the actuator means and adjustment takes place in the length of said adjustable abutment responsive to excessive angular movement of said lever about said pivotal connection, whereby upon overloading of said screwthread connection said shoe spring yields to break off said engagement and interrupt adjustment.

5. An internal shoe drum brake assembly as set forth in claim 4, wherein said pivotal lever and said elongated strut are respectively formed with lugs for receiving the ends of the shoe return spring which maintains said lever normally bearing against said second abutment.

6. An internal shoe drum brake assembly of the duo-servo type comprising a backplate, a pair of arcuate, webbed brake shoes arranged on said backplate with each end of each shoe in facing relationship with a co-operating end of the other said shoe, shoe actuator means between one pair of facing ends of said shoes for moving said shoes toward a braking position, an anchor pin inverted on said back plate adjacent said actuator and between said pair of facing ends for taking the drag when the brake is applied an adjustable abutment floating mounted with respect to said backplate and located between the other pair of facing ends of said shoes, said abutment including a rotatable member and a non-rotatable member said members having screw threaded connected one with the other, a unitary lever extending substantially alongside the web of said shoes arranged to act as the secondary or trailing shoe for forward drum rotation, said lever being pivotally connected to said secondary shoe intermediate the lever ends, a pawl at one end of said lever, a ratchet wheel on the rotatable member of said adjustable abutment, said pawl co-operating with said ratchet, an elongated strut attached at one end to said anchor pin, said strut having its other end free and overlying a portion of said secondary shoe, an engagement between said free end of the strut and the other end of said lever, spring means coupled to each shoe for normally maintaining said shoes in a retracted position and including a shoe return spring for effecting and maintaining said engagement between said strut and said lever at least during the initial stage of brake actuation when relative movement occurs between the free end of the elongated strut and said secondary shoe end adjacent the actuator means and adjustment takes place in the length of said adjustable abutment responsive to excessive angular movement of said lever about said pivotal connection, whereby upon overloading of said screwthread connection said shoe spring yields to break off said engagement and interrupt adjustment.

7. An internal shoe drum brake assembly as in claim 6 wherein said brake shoes are arranged on said back plate by hold down means comprising hold down springs and upstanding pins embraced by said spring, said unitary lever being pivoted on the shoe hold down means of the brake shoe acting as the primary shoe of said assembly.

References Cited
UNITED STATES PATENTS

| | | | |
|---|---|---|---|
| 2,130,857 | 9/1938 | Press | 188—79.5 |
| 2,804,177 | 8/1957 | Helvern | 188—79.5 |
| 3,034,602 | 5/1962 | Bauman | 188—79.5 |
| 3,160,236 | 12/1964 | Riddy | 188—79.5 |

DUANE A. REGER, *Primary Examiner.*